Nov. 13, 1951  E. MEDAL  2,574,883
FILM SPOOL

Filed May 1, 1948  2 SHEETS—SHEET 1

INVENTOR
Einar Medal
BY
John H. Gaynor
ATTORNEYS

Nov. 13, 1951 — E. MEDAL — 2,574,883

FILM SPOOL

Filed May 1, 1948 — 2 SHEETS—SHEET 2

Einar Medal
INVENTOR
BY
ATTORNEYS

Patented Nov. 13, 1951

2,574,883

UNITED STATES PATENT OFFICE 2,574,883

FILM SPOOL

Einar Medal, Albany, N. Y., assignor to Remington Rand Inc., New York, N. Y., a corporation of Delaware Application May 1, 1948, Serial No. 24,477

13 Claims. (Cl. 242—70)

This invention relates to spools primarily intended for winding film on photographic projectors.

The invention provides a spool having a slotted hub and end flange structure for easy insertion of a film end through an exposed end of the hub for retention and winding of the film on the hub; an improved spool which not only facilitates the operation of engaging the end of a film strip for winding on the spool, but also permits the end freely to disengage from the hub when the film is unwound; a spool for use as a take-up spool, in which the operation of securing the end of a film thereon for winding, and disengagement of the film at the termination of unwinding, is so simple and certain that it never becomes necessary to remove the spool from the camera, projector, or equivalent device upon which it is used; and a spool which facilitates engagement of the inner end of a film upon the hub of the spool in such a way that the engaged end lies wholly within the plane defined between flanges or equivalent members provided for laterally confining the film to ensure that it builds up to the single width winding, thus precluding the possibility of damage to the edge of the film by irregular winding.

The invention further provides a spool construction having a slotted hub and end flange structure formed with a plurality of hub sections disposed in spaced complementary relation to form transverse slots open at an exposed end of the hub and an end flange structure for guiding the film in winding and unwinding operations. The end flange structure may be provided at both ends of the hub, and in such an arrangement the end flange structure at the end of the hub through which the transverse slots open is formed in sections, one section on each hub section, thus leaving gaps in the flange structure virtually providing enlarged continuations of the open edges of the slots and providing for extremely simple engagement of a film end upon the hub for winding.

The invention provides a spool having a plurality of hub sections arranged in complementary spaced relation to form a transverse slot extending longitudinally and open at one end of the hub, the opposite ends of the sections being formed integrally with a collar thus constituting a unitary structure; the free end of each hub section having an end flange projecting radially outwardly and cooperating to receive an end of a film strip in the slot in the hub and the gap between adjacent end sections for winding on the hub in spiral relation guided by said end sections.

Figure 1:
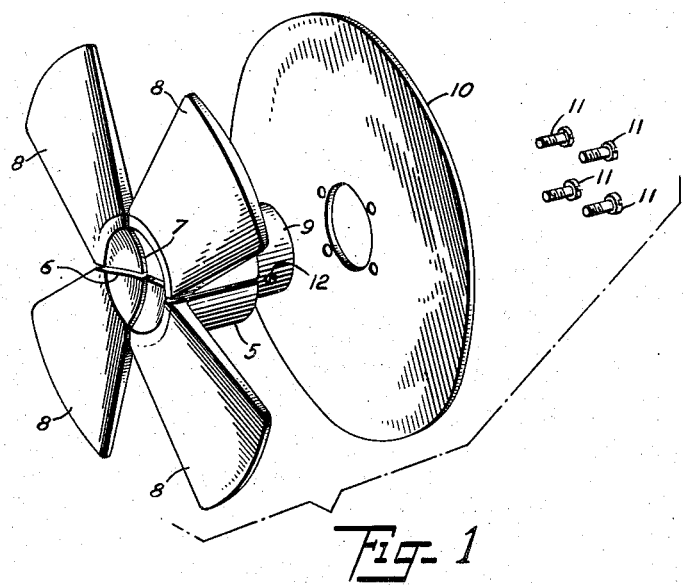
Fig. 1 is an exploded perspective showing a film spool constructed according to the invention.
Figure 2:
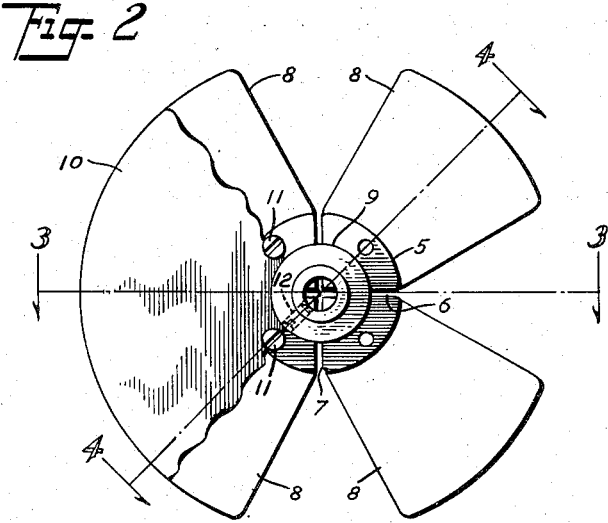
Fig. 2 is an end elevation partly broken away for clearly illustrating details of construction.
Figure 4:
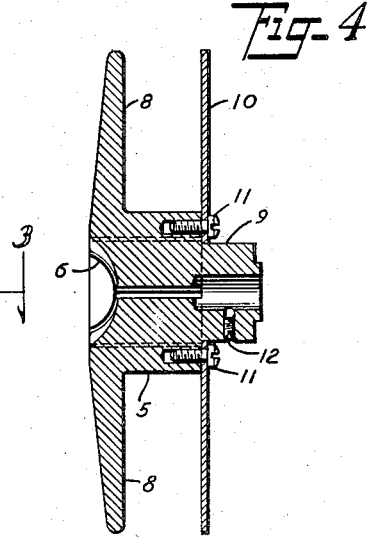
Fig. 4 is a cross-section taken on the line 4—4 of Fig. 2.
Figure 3:
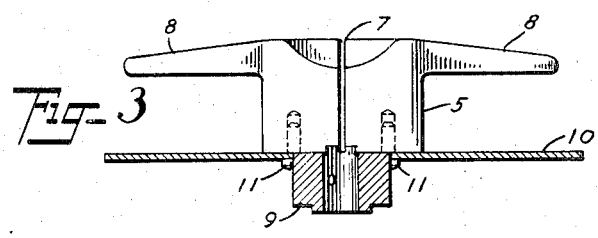
Fig. 3 is a cross-section taken on the line 3—3 of Fig. 2.

The spool shown with reference to Figs. 1 to 4 embodies a hub 5 transversely and radially slotted as indicated at 6 and 7 to define four identical radially spaced and complementary hub sections. The slots 6 and 7 are open at the outer end of hub 5. Each section has a radially extending end flange 8. All flanges 8 lie in the same plane to define one end flange for the spool. At its end remote from flanges 8 the hub has a collar 9. Slots 6 and 7 do not extend into collar 9. The hub sections and collar are formed from a single piece of material, the collar providing a rigid support for all of the hub sections. The hub has a larger diameter than the collar, thus providing a shoulder at the collar end forming an abutment for an end plate 10 about the collar. Screws 11 extend through openings in plate 10 and threadedly engage in the sections of hub 5 for rigidly securing plate 10 to the hub. Collar 9 can be engaged upon the mounting spindle of the film magazine or projector on which the spool is intended to be used, and can be finally locked in position on the mounting spindle by a set screw 12.

It will be noted that slots 6 and 7 open into a depression or partially spherical recess at the outer end of hub 5. The recess or depression terminates inwardly at or slightly beyond a point in the same plane as the inner faces of end flanges 8. The depression or recess is formed by having each hub section formed at the inner portion of the free end with a cut away or recessed portion. The recessed portions of each hub section cooperate in providing the depression or partially spherical recess as shown.

Slots 6 and 7 are closed at the end opposite the recess by end plate 10 so that when film is entered at the outer side of the spool through one or the other of slots 6 and 7, and pushed inwards to the full extent permitted by the depression, the inner edge of the film engages against the inner surface of plate 10 and the outer edge of the film lies just clear of the inner surface of end flanges 8. It is thus ensured that the film is located accurately between the end flange means defined, on the one hand, by end flanges 8, and, on the other hand, by plate 10, so that it can wind and unwind freely without damaging the edges of the film. Slots 6 and 7 extend transversely through the entire hub at right angles as shown in the drawing to divide the hub into equal sector shaped quarter sections arranged in complementary relation. The hub may be produced from moldings or castings each constituting an individual hub section with a radially extending end flange secured in assembled relation on the solid end plate by screws 11.

In use, the end of a film or similar strip may be quickly and easily inserted in either slot 6 or 7 from the outer end of the hub. The end is pushed into a position in the hub so the edges are between end plate 10 and end flanges 8 and, when winding of the strip is started by rotating the spool, the film strip will be wound spirally on the hub and guided by the end plate and end flanges. The end flanges facilitate insertion of the film end in the hub. When the film is unwound from the hub, the end engaged in the slot is sufficiently loose to freely slide outwardly from the slot to automatically disengage the hub without injury.

Figure 5:
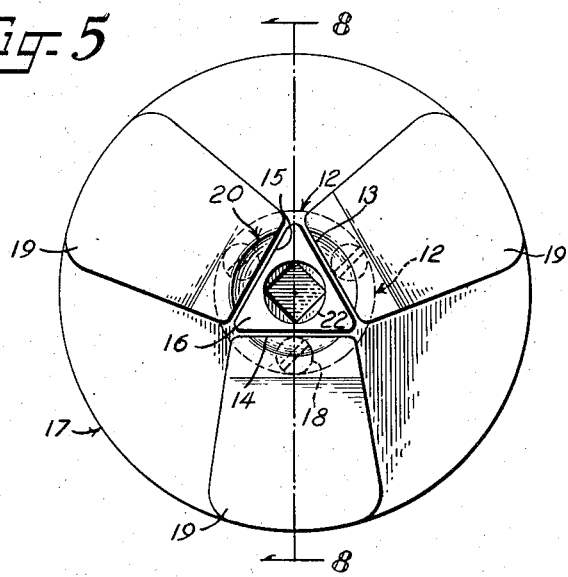
Fig. 5 is an end elevation showing a modified form of the film spool according to the invention.
Figure 6:
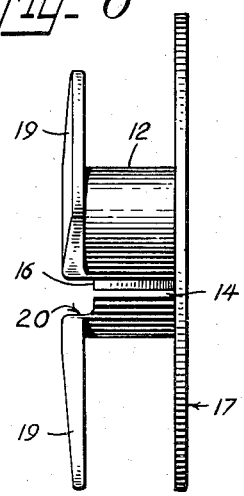
Fig. 6 is a side elevation of the spool shown in Fig. 5.
Figure 7:
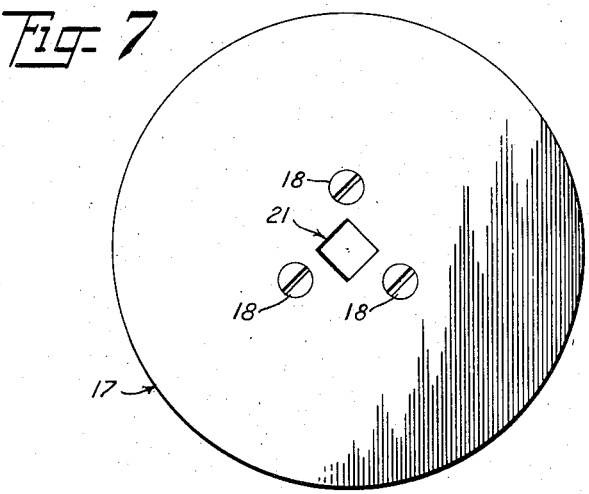
Fig. 7 is an end elevation looking at the opposite end from that of Fig. 5.
Figure 8:
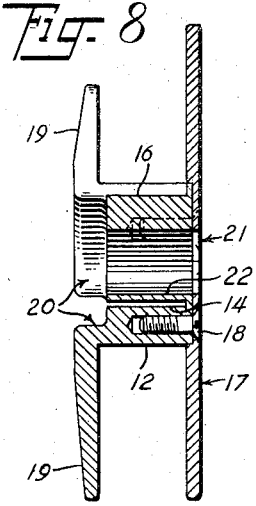
Fig. 8 is a cross-section taken on line 8—8 of Fig. 5.

Referring now to Figs. 5, 6, 7 and 8, the reference numeral 12 designates the hub, and film engaging slots are seen at 13, 14 and 15. The slots 13, 14 and 15 divide the hub 12 into a central triangular core 16 with three sections constituted by segments substantially equally spaced about the core 16. An inner end plate 17 is provided with a central recess into which hub portion 12 is engaged and secured by fixing screws 18. At the outer end of the spool each of the segments has a flange 19 extending radially outward. The flanges 19 lie substantially in the same plane and cooperate with end plate 17 for lateral location of film as it is wound up on the spool. The outer end of hub 12 is provided with a circular recess 20 (see Figs. 6 and 8). The open ends of slots 13, 14 and 15 are accessible at recess 20 and the open edges of the slots are accessible at three equidistantly spaced points on periphery of hub 12. The inner ends of slots 13, 14 and 15 terminate blind in the plane of the inner surface of end plate 17, and it is, therefore, a simple matter to insert the end of the film to be spooled into the outer end of whichever of slots 13, 14 or 15 comes most conveniently to hand at the time of insertion, the film being pressed into the slot until its inner end abuts the inner surface of plate 17.

It will be noted that end plate 17 is provided at its center with a square hole 21 through which the spool drive can be transmitted through a spool drive spindle of the machine upon which the spool is intended to be used, and in that way the bore in core 16 for receiving the outer end of the spool drive spindle can be circular, as indicated at 22, to serve merely as locating means without the necessity for fitting the spool with driving engagement.

The spool shown in Figs. 5, 6, 7 and 8 is primarily intended for use in a film projector device in which each spool engages horizontally on a substantially vertical spindle. With such an arrangement the spool is kept in position on the spool drive spindle by its own weight, and it is unnecessary to provide a set screw for fastening the spool in position.

Although, in the ensuing claims, the spool has been designated a film spool it is to be understood that it is equally applicable for spooling paper strip employed in the photographic art and it is not intended that the term "film" is to be construed in a limited sense.

The invention claimed is:

1. A film spool comprising an axial hub having film locating means at each end for laterally confining film to single width winding on the hub, slot means open at one end of said hub extending across said hub to split the same at its outer end, said slot means extending axially into the hub to terminate blind therein for location therein of the inner end of film to be spooled, and a depression in the end of said hub in the vicinity of the open end of said slot means; the depth of that portion of said slot means between the blind end of said slot means and the inner end of said depression corresponding to the axial length of the hub between the inner surfaces of said film locating means.

2. A film spool comprising an axial hub, slot means open at one end of said hub and extending therethrough substantially transversely of the axis thereof to define sections spaced by said slot means, a collar at one end of said hub unifying said hub and incorporating means of connection to a mounting spindle, said collar being smaller in cross-section than said hub and defining at its mergence therewith an annular abutment shoulder, an end flange engageable on said collar, means for securing said flange against said abutment shoulder, and a flange extending radially outwardly from each section to define, with said end plate, means for laterally locating spooled film wound on the hub.

3. A film spool comprising a hub having a plurality of sections arranged in complementary spaced relation to form a complete spool hub with transverse slots defined between said sections throughout the length thereof, an end flange on the end of each hub section extending in radial relation outwardly therefrom, said flanges cooperating in assembled relation to guide a film strip being wound on said hub, and means, at the end of said hub remote from said flanges, uniting said sections for mounting the spool on a spindle.

4. A film spool comprising a hub having a plurality of sections arranged in spaced relation to form a transverse slot in said hub extending throughout the length thereof for receiving an end of a film strip to be secured for winding on said hub by insertion into said slot from one end of said hub, a collar at one end of said hub uniting said sections in assembled hub forming relation, and end flange means at an end of said hub for guiding a film strip in winding and unwinding operations.

5. A film spool comprising a collar, a hub formed of a plurality of sections extending from said collar in endwise relation thereto and arranged in spaced relation to form a hub having a transverse slot extending longitudinally throughout the length of said hub and open at the end opposite said collar for receiving an end of a film strip in said slot, an end plate mounted on said collar at the end of said hub, an end flange on the free end of each hub section extending in radially outward relation for cooperation with said end plate in guiding and retaining a film strip in wound relation on said hub, and a recess formed at the inner portion of each hub section communicating with said slot and extending inwardly toward the opposite end of said hub at least as far as the plane of the inner faces of said end flanges to facilitate manual insertion of a film end into a correct winding position between said end plate and end flanges.

6. A film spool comprising a hub formed of a plurality of sections arranged in spaced relation to form a hub having a transverse slot extending longitudinally throughout the effective length thereof and open at one end for receiving an end of a film strip in said slot through its open end, an end plate mounted on the opposite end of said hub, an end flange on each hub section at said one end of said hub extending in radially outward relation for cooperation with said end plate for guiding and laterally locating a film strip in wound relation on said hub; each of said sections having a recess formed at said one end in the inner portion thereof communicating with said slot and extending inwardly toward the opposite end of said hub at least as far as the plane of the inner faces of said end sections to facilitate manual insertion of a film end into a correct winding position in said hub.

7. A film spool comprising a hub formed with three slots extending across said hub each with an end open at one end of said hub and with edges open at points spaced equidistantly about the periphery of the hub, said slots defining at the periphery of said hub three substantially equal and equally spaced segments; a flange extending radially outwardly from the periphery of each segment at said one end of the hub, said flanges lying in spaced relation in a plane at right angles to the axis of said hub to provide, between adjacent flanges, gaps continuous with the open end and edges of said slots, whereby to render said open ends and edges accessible for unimpeded entry of the end of a film to be secured for winding on said hub into any one of said slots; means closing the ends of said slots remote from the flanges, to define between said means and the plane of the inner surfaces of said flanges, a slot of correct depth for location of entered film in a position for single width winding guided on said hub by said flanges; and means for engaging said spool upon a mounting spindle.

8. A film spool comprising a hub having an inner end and an outer end and having three slots extending across said hub each with an end open at the outer end of said hub and with an end closed at the inner end of said hub and with edges open at points spaced equidistantly about the periphery of the hub, said slots defining at the periphery of said hub three substantially equal and equally spaced segments; a flange extending radially outwardly from the periphery of each segment at the outer end of said hub, said flanges lying in spaced relation in a plane at right angles to the axis of said hub to provide, between adjacent flanges, gaps continuous with the open end and edges of said slots, whereby to render said open end and edges accessible for unimpeded entry of the end of a film to be secured for winding on said hub into any one of said slots; an end plate at the inner end of said hub having an inner surface lying in a plane at right angles to the axis of said hub and coincident with the closed end of said slots to define, with the inner surfaces of said flanges, means for laterally locating as a single width winding, film spooled on said hub about an end of said film secured in any one of said slots; and means for drivably engaging said spool upon a mounting spindle.

9. A winding spool comprising an axial hub having four identical sector-shaped sections defining two slots intersecting each other at right angles extending through said hub transversely to the axis thereof and being open at an end of said hub, into either of which slots the end of strip can be entered from said end of the hub to be anchored for spooling, thus providing four positions equidistant about the circumference of said hub at which the strip can be engaged.

10. A winding spool consisting of a hub, a flange radially extending from one end thereof, said hub being split into a plurality of sections at the other end thereof by a slot extending across said hub with one end open at said latter end and with edges open at points circumferentially spaced on the periphery of said hub means extending radially from each section in spaced relation, whereby to present at said end an uninterrupted slot extending completely across said end of the spool for insertion through said end of strip to be wound on said spool.

11. A film spool comprising a hub, a flange radially extending from one end thereof, said hub being split into a plurality of sections by a film engaging slot extending across said hub with one end open at the other end of said hub and with the edges open at points circumferentially spaced on the periphery of said hub, the depth of said slot axially of the hub being greater than the intended width of film to be engaged thereon, means for engaging said spool on a spool receiving spindle, and flange means extending radially outward from said sections to define means for laterally locating spooled film wound on said hub portion, said flange means including a sector-shaped member co-extensive with each section and spaced one from the other, whereby adjacent edges of said sector-shaped members cooperate to define openings in said flange means increasing in width towards the periphery of said flange means and co-extensive with the edges of said slot.

12. A film spool comprising a hub, a slot open at one end of said hub extending across said hub to split the same at its outer end, said slot extending axially into the hub to terminate blind therein for location therein of the inner end of film to be spooled, and the end of said hub in the vicinity of the open end of said slot being recessed with the depth of that portion of said slot between the blind end of said slot and the inner end of said recessed hub end corresponding to the width of the strip material to be wound on said hub whereby the recessed hub end permits manual registration of the strip material in said slot.

13. A winding spool including a hub having an end formed to define a plurality of sections with a slot between them, said slot being open at one end of said hub and extending straight through said hub transversely with respect to the axis thereof with edges open at points circumferentially spaced on the periphery of said hub, and flange means extending radially outward at said end of said hub; said flange means including plural members with the adjacent radial edges thereof defining openings co-extensive with said slot means, whereby to provide a continuous slot extending chordally right across said hub and flange structure at said end through which strip may be engaged in said slot through said end.

EINAR MEDAL.

REFERENCES CITED

The following references are of record in the file of this patent:

UNITED STATES PATENTS

| Number | Name | Date |
|---|---|---|
| 1,009,673 | Lang | Nov. 21, 1911 |
| 1,856,112 | Porter | May 3, 1932 |
| 2,033,905 | Kingsley | Mar. 10, 1936 |
| 2,467,607 | Bates | Apr. 19, 1949 |

FOREIGN PATENTS

| Number | Country | Date |
|---|---|---|
| 335,780 | Great Britain | Oct. 2, 1930 |